M. R. JONES.
HORSETAIL HOLDER.
APPLICATION FILED NOV. 13, 1908.
934,669.
Patented Sept. 21, 1909.
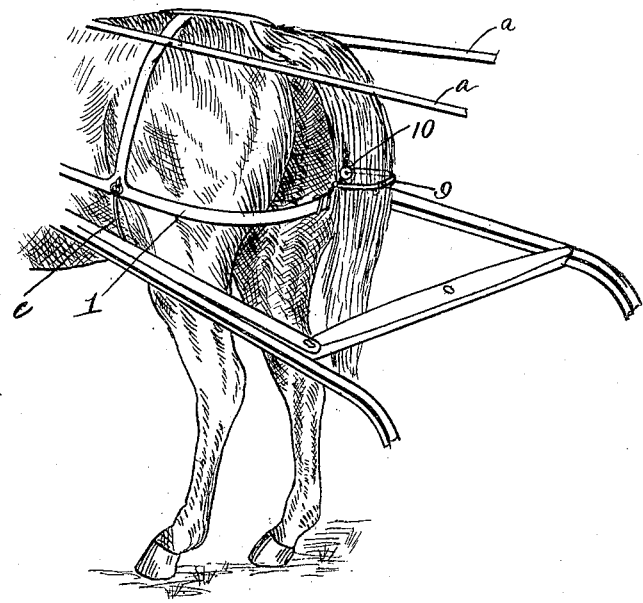
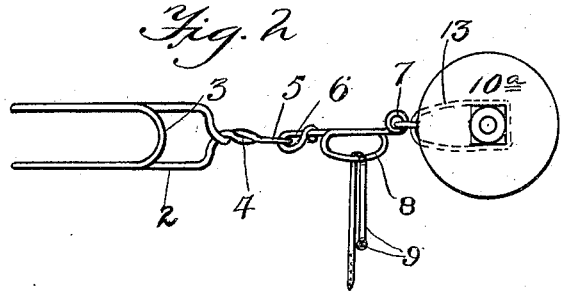
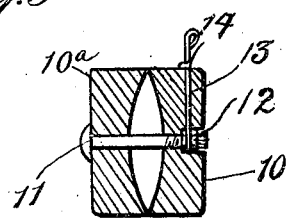
Witnesses
Addison F. Smith
Inventor
Murphy R. Jones.
By Victor J. Evans
Attorney

UNITED STATES PATENT OFFICE.

MURPHY R. JONES, OF JEFFERSON, ALABAMA.

HORSETAIL-HOLDER.

934,669. Specification of Letters Patent. Patented Sept. 21, 1909.

Application filed November 13, 1908. Serial No. 462,492.

*To all whom it may concern:*

Be it known that I, MURPHY R. JONES, a citizen of the United States of America, residing at Jefferson, in the county of Marengo and State of Alabama, have invented new and useful Improvements in Horsetail-Holders, of which the following is a specification.

This invention relates to horse tail holders, and one of the principal objects of the same is to provide a simple and efficient device to be connected to the breeching or other parts of the harness for holding the tail of a horse and preventing it from being switched over the driving reins.

Another object of the invention is to provide a clamp designed to be secured to the hairs of a horse's tail, said clamp being mounted upon a hook or clasp to be connected to the breeching or other parts of the harness.

These and other objects may be attained by means of the construction illustrated in the accompanying drawing, in which,—

Figure 1 is a perspective view illustrating my horse tail holder in use. Fig. 2 is a plan view of the horse tail holder removed from the breeching. Fig. 3 is a transverse sectional view through the clamp.

Referring to the drawing, the numeral 1 designates the breeching of a harness, and connected to the breeching is a hook 2 forming part of my horse tail holder, said hook having a wide bill 3 and a twisted shank 4 provided with a loop 5. Connected to the loop 5 is a wire support provided with a loop 6 engaging the loop 5 and upon its opposite end a ring 7 to which the clamp is connected. The support is bent into the form of a ring or loop 8 through which a cord or strap 9 may be passed for encircling the tail of a horse and holding it connected to the clamp.

The clamp comprises the two members 10 and 10ᵃ which may be formed of wood, leather, rubber or other similar material, said members being preferably round in plan and provided with concaved inner faces. A bolt 11 extends centrally through these members and is provided with a nut 12 by means of which the members may be clamped together to engage the hairs of the tail. To connect the clamp to the supporting ring 7, one end of a wire strand 13 passes partly through one of the members and the other end formed into an eye 14 which is connected to the ring 7. The inner ends of the strand 13 engage the nut 12 to prevent it from turning off the bolt 11.

The operation of my invention may be briefly described as follows:—When the two clamp members are connected to the tail of a horse, the clamp member 10 is turned to clamp the hair between the two members of the clamp. The nut 12 on the bolt 11 is seated in a recess in the member 10 and is thus turned on the bolt when the member 10 is rotated. The hook 2 is connected with the breeching 1, as shown in Fig. 1 of the drawing, or in case of a double team where the breeching is not used a strap or cord $c$ may be connected to the harness and passed under the horse when not in use. When it is desired to connect the hook 2 to the strap or cord $c$, the latter is passed around the horse in the place occupied by the breeching 1, in Fig. 1 of the drawing. In this condition the horse may swing the tail slightly from one side to the other, but not sufficiently to throw the same over the reins $a$.

My invention is of simple construction, can be manufactured at slight cost and can be readily applied to any harness.

I claim:

A horse tail holder comprising circular clamp members provided with a central bolt, a hook to be connected to the harness, a support between the hook and clamp, said support being pivotally connected to said hook and clamp and provided with a ring, and a strap or cord extending through the ring to engage the horse's tail.

In testimony whereof I affix my signature in presence of two witnesses.

MURPHY R. JONES.

Witnesses:
 ED. MANNING,
 J. V. COATS.